US012723671B2

(12) United States Patent
Schlittenbauer et al.

(10) Patent No.: US 12,723,671 B2
(45) Date of Patent: Sep. 1, 2026

(54) SYSTEM FOR REGULATING THE FLOW OF A FLUID

(71) Applicant: AUDI AG, Ingolstadt (DE)

(72) Inventors: Lena Schlittenbauer, Altmannstein (DE); Klaus Ternovan, Oberostendorf (DE); Herbert Tschentscher, Riedenburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/083,297

(22) Filed: Mar. 18, 2025

(65) Prior Publication Data

US 2025/0215996 A1 Jul. 3, 2025

Related U.S. Application Data

(62) Division of application No. 18/187,556, filed on Mar. 21, 2023, now Pat. No. 12,276,353.

(30) Foreign Application Priority Data

Mar. 22, 2022 (DE) ..................... 10 2022 106 609.6

(51) Int. Cl.
*F16K 17/36* (2006.01)

(52) U.S. Cl.
CPC ........... *F16K 17/36* (2013.01); *Y10T 137/108* (2015.04); *Y10T 137/1098* (2015.04)

(58) Field of Classification Search
CPC ........... Y10T 137/108; Y10T 137/1098; F16K 17/36; G05D 13/00; F16H 2710/20
See application file for complete search history.

(56) References Cited

U.S. PATENT DOCUMENTS

| | | | | |
|---|---|---|---|---|
| 3,191,610 | A | 6/1965 | Zeisloft | |
| 3,198,508 | A * | 8/1965 | Melton | F16F 1/13 174/146 |
| 3,266,506 | A | 8/1966 | Noriyuki et al. | |
| 3,294,074 | A | 12/1966 | Mennicken et al. | |
| 3,450,144 | A | 6/1969 | Horsch | |
| 3,631,871 | A * | 1/1972 | Shimosaki | G05D 13/00 137/56 |
| 3,642,014 | A * | 2/1972 | Searles | F16H 61/00 137/54 |

(Continued)

FOREIGN PATENT DOCUMENTS

| | | | |
|---|---|---|---|
| CN | 113374917 | A | 9/2021 |
| CN | 215311597 | U | 12/2021 |
| DE | 102019104109 | A1 | 8/2020 |

OTHER PUBLICATIONS

Office Action, dated Feb. 22, 2023, for German Patent Application No. 10 2022 106 609.6 (7 pages).

*Primary Examiner* — Kevin F Murphy
(74) *Attorney, Agent, or Firm* — Seed Intellectual Property Law Group LLP

(57) ABSTRACT

A system and method for regulating a flow of a fluid, wherein the system comprises a regulating device and a central axis, wherein the regulating device is adapted to establish at least one through-passage opening for the fluid, wherein a normal vector of a cross sectional area of the at least one through-passage opening is oriented parallel to the axis, wherein a size of the cross-sectional area is adjusted in dependence on the rotary speed of the regulating device turning about the central axis.

10 Claims, 10 Drawing Sheets

(56) References Cited

U.S. PATENT DOCUMENTS

| | | | | |
|---|---|---|---|---|
| 3,683,950 | A * | 8/1972 | Yamada | F16H 61/00<br>137/56 |
| 3,789,863 | A * | 2/1974 | Enomoto | F15B 5/00<br>137/54 |
| 5,398,713 | A | 3/1995 | Whitman | |

* cited by examiner

SYSTEM FOR REGULATING THE FLOW OF A FLUID

BACKGROUND

Technical Field

This disclosure relates to a system for regulating the flow of a fluid and a method for regulating the flow of a fluid.

Description of the Related Art

A centrifugal valve can be used to adjust the flow of a fluid. A valve device having a valve element moving in dependence on centrifugal force is known from the document DE 10 2019 104 109 A1. The document CN 113374917 A describes a highly sensitive proportional valve. A centrifugal valve is described in the document U.S. Pat. No. 5,398,713 A.

BRIEF SUMMARY

Some embodiments provide systems and/or methods to adjust a flow or a current of a fluid in a suitable manner. Some embodiments include systems and/or methods designed to regulate a flow or current of a fluid, such as a liquid or a gas. The system comprises a regulating device and a central axis. The regulating device is adapted to establish and/or provide at least one through-passage opening for the fluid, wherein each time a through-passage opening being established and/or provided is arranged between two transport ducts for the fluid and allows a transport of the fluid between the transport ducts. A normal vector of a cross sectional surface of the at least one through-passage opening of the regulating device or a normal vector of a plane in which the cross sectional surface is situated is oriented or directed parallel to the axis of the system, and the cross sectional surface is furthermore extended and/or extensible or to be extended radially with regard to the axis. The size of the cross sectional surface of the through-passage opening is adjusted or may be adjusted or is adjustable in dependence on the rotary speed of the regulating device turning about the central axis in one of two possible oppositely oriented directions during the operation of the system.

During the operation of the system, when it is turning, a centrifugal force acts on the regulation device and thus on the through-passage opening provided by it, which adjusts and thus changes the size of the cross sectional surface in a radial direction with respect to the axis. Depending on the configuration of the regulation device and thus of the system, the cross sectional surface is or becomes larger as the rotary speed is greater. Alternatively, depending on the configuration, it is also possible for the cross sectional surface to become smaller as the rotary speed is greater.

The system furthermore comprises a carrier body, such as a housing, having at least one recess, such as an annular recess, in which the regulating device is integrated or in which it can be received.

At least one of the transport ducts, in one configuration all of the transport ducts, may be oriented parallel to the axis and thus also parallel to the normal vector of the cross sectional surface of the at least one through-passage opening. At least one transport duct may be designed as an annular duct or a duct shaped as the envelope of a cylinder, being situated coaxially to the axis and enclosing it. Alternatively, or additionally, at least one transport duct may be oriented parallel to the axis and may have a cross-sectional surface in the form of an ellipse, such as a circle, or a polygon. It is also possible for at least one cross sectional surface to have an axial extension which is and varies in dependence on the radial distance from the central axis, it being possible for this extension to increase with increasing radial distance from the axis in one embodiment and to decrease with increasing radial distance from the axis in an alternative embodiment.

In one embodiment of the system, the regulating device has a rotationally symmetrical main body, such as an annular one, made from an elastically deformable material, such as an elastomer. In this elastic main body, in one embodiment, there is arranged or integrated at least one deformation region, such as a hollow region or a region formed as a recess, such as a duct and/or borehole. It is also possible for the main body to be situated in an axially oriented recess of the carrier body, such as a rotationally symmetrical one.

Furthermore, it is possible for the at least one transport duct to run through the carrier body, through the main body and/or between the carrier body and the main body, the at least one transport duct and a transition between the main body and the carrier body being joined together. It is possible for the at least one through-passage opening to be arranged optionally between the carrier body and the elastic main body of the regulating device, i.e., at one place on a boundary or the transition between the carrier body and the main body, and to extend in the axial direction between them.

In some embodiments, at least one accessory body may be integrated in the elastically deformable main, having less elasticity or deformability than the main body. Such an accessory body is formed or designated as a mass body, for example. Furthermore, it is possible for the at least one deformation region and the at least one accessory body, such as the mass body, to be radially and/or axially set off from the axis, whereby either the at least one deformation region has a lesser radial distance from the axis than the at least one accessory body or vice versa.

During the operation of the system, the turning main body will be deformed in the radial direction, depending on the rotary speed and the centrifugal force acting on it, whereupon the cross sectional surface of the at least one through-passage opening is accordingly adjusted or adjustable and thus changed or may be changed in the radial direction by deformation of the main body and becomes larger or smaller in the radial direction and depending on the radial speed. This is also the case when the at least one through-passage opening is situated between the main body and the carrier body in the radial direction.

In some embodiments, the carrier body is rigid and has less elasticity than the elastically deformable main body. During the operation of the system, the carrier body generally remains unchanged, while the main body is elastically deformed and changed relative to the axis and the carrier body, depending on the rotary speed, wherein the cross sectional surface of the at least one through-passage opening is varied or is to be varied between the main body and the carrier body in the radial direction and becomes larger or smaller depending on the embodiment.

Alternatively, or additionally, at least one axial and elastically deformable transport duct is led as a regulating duct for the fluid through the main body parallel to the axis and arranged in the main body, it being possible for this at least one transport or regulating duct to run centrally through the main body or to be radially set off from the axis and to have the at least one through-passage opening. This elastically deformable transport duct, enclosed by the elastically deformable main body, is designed to surround and/or bound the at least one through-passage opening.

In some embodiments, the regulating device comprises at least one mechanical arrangement, which in turn comprises a piston and a spring for a respective through-passage opening, the piston being stressed or meant to be stressed by the spring, while the piston is radially displaceable or to be displaced or is displaced by the spring perpendicular to the axis and thereby is moved relative to the respective through-passage opening and is adapted to closing entirely or at least partially, or opening or opening completely, this through-passage opening depending on the rotary speed-dependent position of the piston relative to the axis and relative to the through-passage opening. It is possible to arrange either the spring between the axis and the piston, or to arrange the piston between the axis and the spring. This mechanical arrangement is situated each time in a radial transport duct as a recess in the carrier body.

Regardless of whether the regulating device, and thus the system, comprises the elastic main body or the at least one mechanical arrangement, the cross sectional surface of the at least one through-passage opening changes in the radial direction upon changing rotary speed perpendicular to the axis. At constant rotary speed, a constant cross sectional surface may be established.

The method according to the disclosure is designed to regulate a flow of a fluid with a regulating device and furthermore with an embodiment of the proposed system having such a regulating device. With the regulating device used in this way, at least one through-passage opening for the flowing fluid is established and/or provided. Each time a through-passage opening is arranged or will be arranged between two respective transport ducts for the fluid, and each time a through-passage opening is situated between two respective transport ducts. Moreover, a cross sectional surface of the at least one through-passage opening may be arranged in a plane, and a normal vector of the cross sectional surface or the plane is or will be oriented parallel to the axis, the cross-sectional surface furthermore being extended parallel to a radial direction and parallel to a tangential direction of the rotating regulating device and thus the rotating system. Furthermore, the size of the cross sectional surface is established and/or provided at least in the radial direction in dependence on the rotary speed of the regulating device turning about the central axis during the operation of the system, usually being changed in dependence of the rotary speed.

It is possible for the size of the cross sectional surface to have a starting value for a rotary speed of zero revolutions per minute. In one embodiment of the method, it is possible for such a starting value to correspond to a minimum value, possibly to a value of zero, for the static nonmoving regulating device, and accordingly only a minimal quantity of the fluid can flow through the at least one through-passage opening, the size of the cross sectional surface of the at least one through-passage opening increasing in the radial direction with increasing rotary speed of the rotating regulating device, while also the quantity of fluid flowing through the at least one through-passage opening is increased. If the size of the cross sectional surface should be zero in the static state, it is closed and will only be opened and thus provided and established accordingly, at least in the radial direction with increasing rotary speed, while in the static state at first no fluid at all can flow through the closed through-passage opening, and the fluid can only flow at all if the through-passage opening is rotating. On the other hand, it is possible for the starting value for the size of the cross sectional surface to have a maximum value in the static state of the regulating device, and for the size to decrease at least in the radial direction with increasing rotary speed, while the quantity of fluid flowing through will also be decreased accordingly.

The proposed regulating device is operated by centrifugal force, the quantity of fluid flowing through the at least one through-passage opening being dependent on the rotary speed of the regulating device. The system and/or the regulating device of the system may be called a centrifugal force valve. Furthermore, it is also possible to regulate a pressure and/or a volume flow of the fluid thanks to the centrifugal forces arising during the rotary movement of the regulating device. In one embodiment, the regulating device is turned by a shaft, which is situated coaxial to the axis. Such a shaft is designed, for example, as a component of a rotating structural part, such as the above-described carrier body, which drives and thus turns the regulating device.

Thus, no sensors or actuators are needed to establish a flow of the fluid. A value, such as a particular required nominal value, for the flow, i.e., the pressure, the quantity, or the volume flow rate of the fluid, is dependent on the layout of the regulating device, such as the shape of the elastic main body and/or its elasticity. It is possible for the elasticity of the main body provided in one embodiment to be either homogeneous or to vary in dependence on the radius, depending on the radius with regard to the axis. The elasticity in another embodiment is dependent on the density of the main body and/or the arrangement and/or positioning of the at least one deformation region integrated in it and/or the at least one accessory body depending on the radial distance relative to the axis. A characteristic curve for the rotary speed-dependent regulating of the flow of the fluid, describing the dependency of the pressure and/or the volume flow rate on the rotary speed, is contingent upon the particular design of the regulating device. It is also possible for a particular characteristic of the rotary speed to be a curve or a line. It is possible to integrate the regulating device and thus the system in an existing rotary arrangement and thus retrofit that arrangement.

Of course, the above mentioned features and the features yet to be explained below can be used not only in the particular indicated combination, but also in other combinations or standing alone.

BRIEF DESCRIPTION OF THE SEVERAL VIEWS OF THE DRAWINGS

Embodiments are presented schematically with the aid of the drawings and described schematically and at length with reference to the drawings.

DETAILED DESCRIPTION

Figure 1:
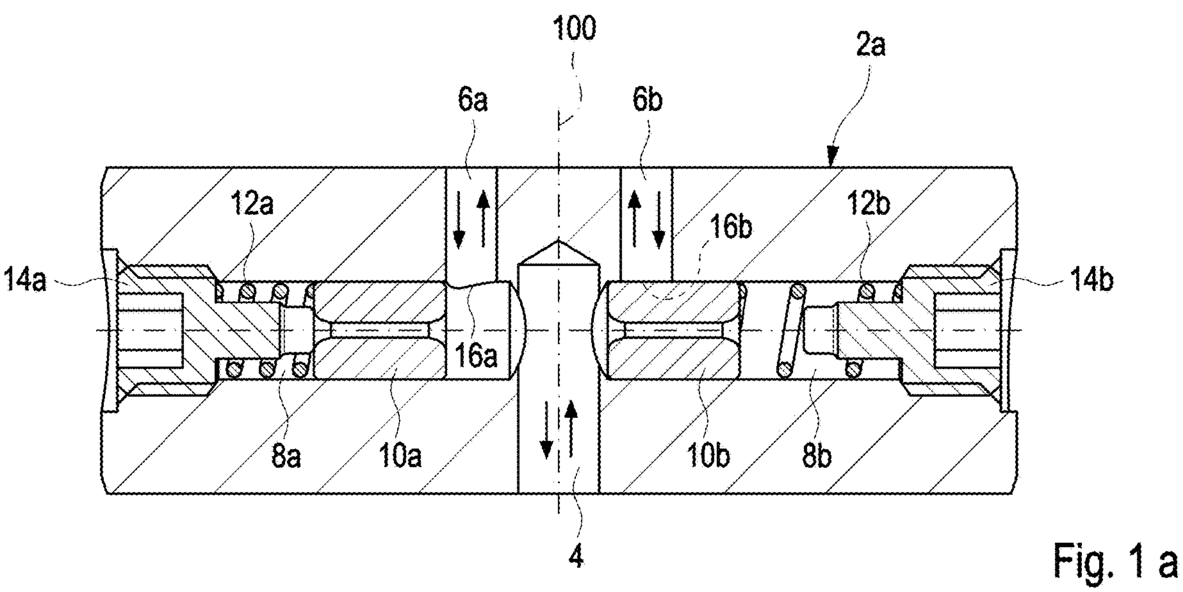
FIGS. 1*a* and 1*b* show in schematic representation a first embodiment of a system according to the disclosure to carry out a first embodiment of a method according to the disclosure.
Figure 1:
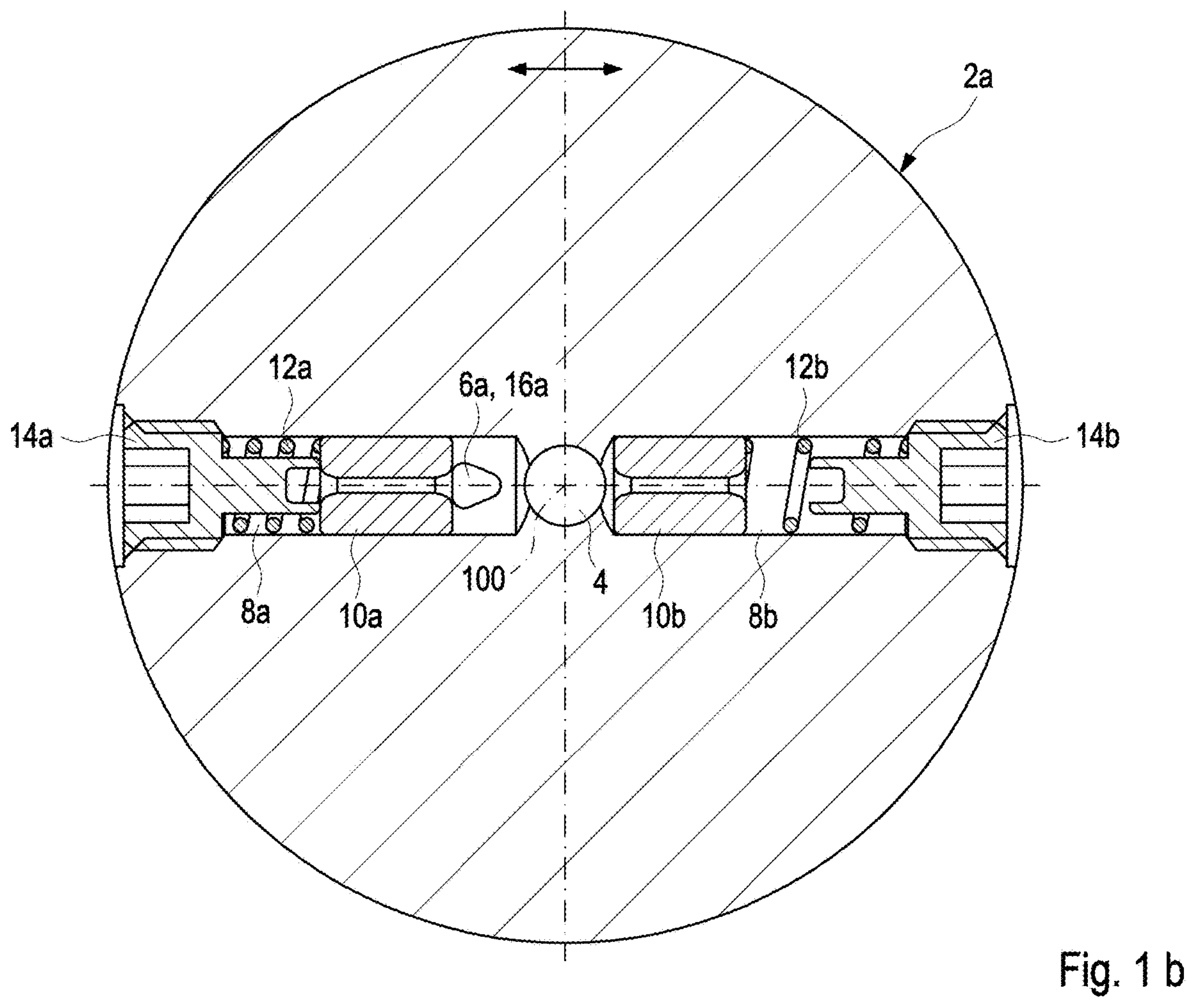

The first embodiment of the system is shown schematically in FIG. 1*a* in a cross section through a central axis 100 of this system and in FIG. 1*b* perpendicular to this central axis 100. The second embodiment of the system is shown schematically in FIG. 2*a* in a cross section through a central axis 100 of this system and in FIG. 2*b* perpendicular to this central axis 100.

The first and second embodiment of the system can also be configured or designated as a mechanical embodiment of the system. The first and second embodiment of the system comprise a rigid carrier body 2*a* or 2*b*, here designated or configured as a housing. In the carrier body 2*a*, 2*b* there is arranged a central axially oriented and cylinder-shaped transport duct 4, although it only passes partly through this carrier body 2*a*, 2*b*, the transport duct 4 being bounded by a wall inside the carrier body 2*a*, 2*b*. Furthermore, two radial transport ducts 8*a*, 8*b* are arranged in the carrier body 2*a*, 2*b*, being oriented perpendicular to the axis 100, each being connected to the central transport duct 4 and extending radially outward from the central transport duct 4 and having a cylinder shape. Each radial transport duct 8*a*, 8*b* is formed as a recess to receive a respective regulating device, being a mechanical device in the present case. Furthermore, each time a decentral and axially oriented transport duct 6*a*, 6*b* or 6*c*, 6*d* is connected to a respective radially oriented transport duct 8*a*, 8*b*. In the first embodiment of the system, the two decentral axial transport ducts 6*a*, 6*b* have a shorter distance from the axis 100 than the two decentral axial transport ducts 6*c*, 6*d* of the second embodiment of the system.

Each mechanical regulating device arranged in a radially oriented transport duct 8*a*, 8*b* comprises a piston 10*a*, 10*b*, a spring 12*a*, 12*b* and a locking screw 14*a*, 14*b*, each time the piston 10*a*, 10*b* having a smaller radial distance from the axis 100 than the respective locking screw 14*a*, 14*b*, while the spring 12*a*, 12*b* is arranged between the piston 10*a*, 10*b* and the locking screw 14*a*, 14*b*. Furthermore, each through-passage opening 16*a*, 16*b*, 16*c*, 16*d* of the system is dictated by a geometry of a respective decentral transport duct 6*a*, 6*b*, 6*c*, 6*d*, the through-passage opening 16*a*, 16*b*, 16*c*, 16*d* forming at the same time a transition between a respective decentral transport duct 6*a*, 6*b*, 6*c*, 6*d* and a radial transport duct 8*a*, 8*b*. Moreover, a normal vector of a cross sectional surface of the through-passage opening 16*a*, 16*b*, 16*c*, 16*d* is oriented parallel to the central axis 100.

Figure 2:
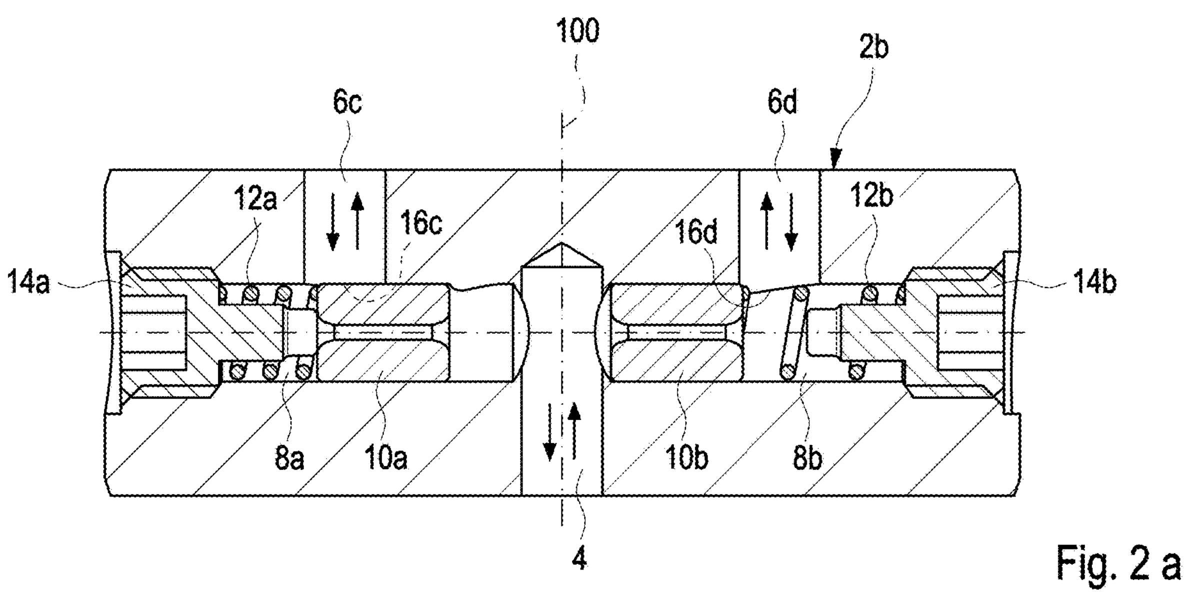
FIGS. 2*a* and 2*b* show in schematic representation a second embodiment of the system according to the disclosure to carry out a second embodiment of the method according to the disclosure.
Figure 2:
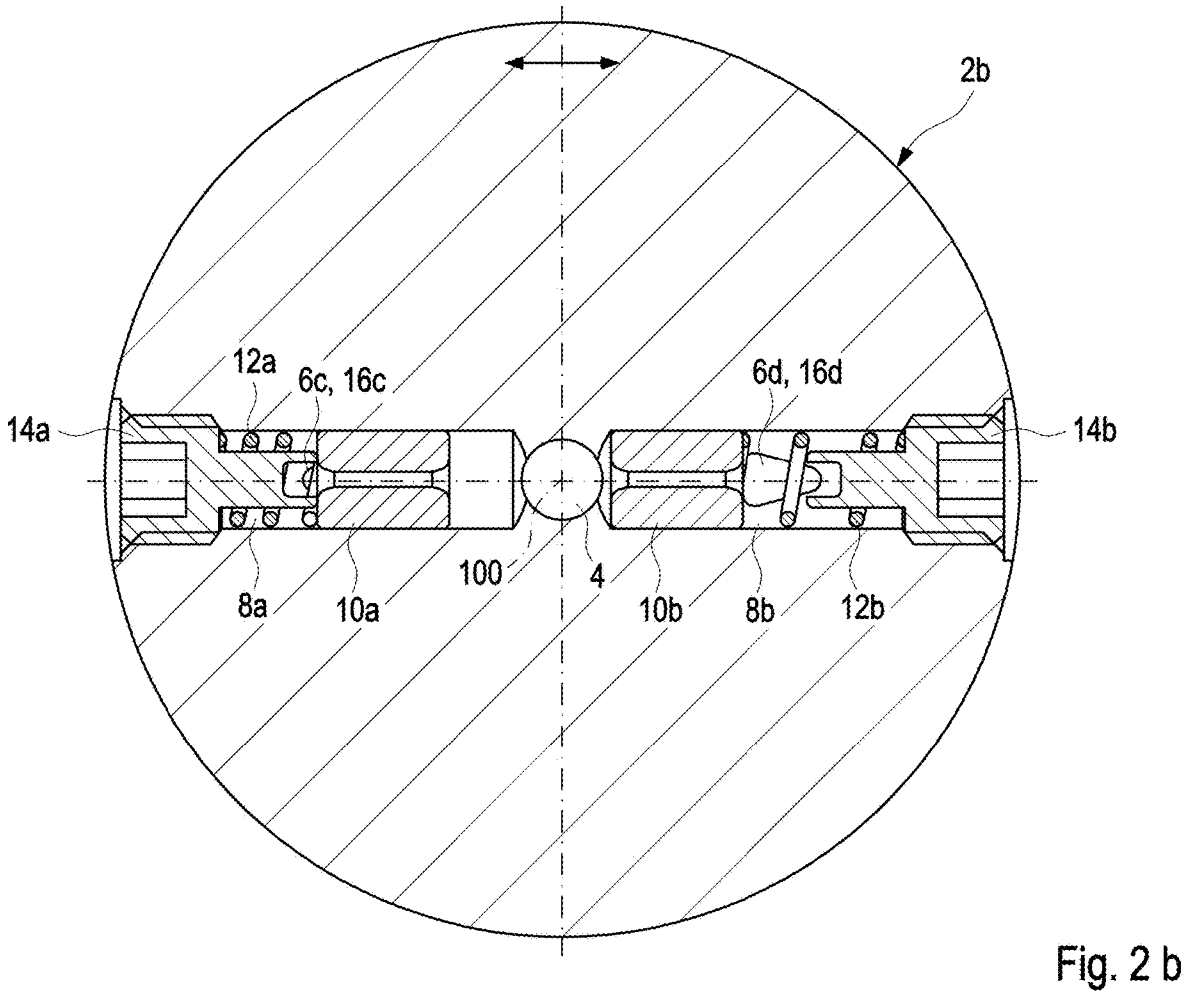

In FIG. 1*b* and FIG. 2*b*, there is indicated by a double arrow the direction of turning of the carrier body 2*a*, 2*b* about the central axis 100. Furthermore, arrows in FIGS. 1*b* and 2*b* which are associated with respective axially oriented transport ducts 4, 6*a*, 6*b*, 6*c*, 6*d* show that a fluid during operation of the system can flow in two possible opposite directions through these axial transport ducts 4, 6*a*, 6*b*, 6*c*, 6*d*. In an embodiment of the method, the piston 10*a*, 10*b* by virtue of centrifugal force arising upon rotation of the carrier body 2*a*, 2*b* is pushed outward from the central axis 100 dependent on the rotary speed, while the spring 12*a*, 12*b* acts against the respective displacement of the piston 10*a*, 10*b*. Depending on the rotary speed-dependent position of the piston 10*a*, 10*b*, a respective through-passage opening 16*a*, 16*b*, 16*c*, 16*d* of a duct 6*a*, 6*b*, 6*c*, 6*d* is completely closed in the radial direction with respect to the axis 100, the flow of fluid being prevented, or it is partly closed or opened, or it is completely opened, while in the latter case the maximum quantity of fluid can flow through the through-passage opening 16*a*, 16*b*, 16*c*, 16*d*.

In the first and second embodiment of the system, it is provided that a radial position of a first piston 10*a* results in FIG. 1*a*, 1*b* or 2*a*, 2*b* to the left of the axis 100 at a high rotary speed of the system, such as the maximum speed, and a radial position of a second piston 10*b* results in FIG. 1*a*, 1*b* or 2*a*, 2*b* to the right of the axis 100 at a high rotary speed of the system, such as the minimum speed. In the first embodiment of the system and thus of the method (FIG. 1*a*, 1*b*), the through-passage opening 16*a* of the transport duct 6*a* is freed up and completely opened at the high rotary speed by the radially outward displaced piston 10*a*, while the through-passage opening 16*b* of the transport duct 6*b* at the low rotary speed is completely closed by the radially inward displaced piston 10*b*. Conversely, in the second embodiment of the system and the method, as indicated by FIG. 2*a*, 2*b*, a through-passage opening 16*c* of the transport duct 6*c* at a high rotary speed is completely closed by the piston 10*a* in the radial transport duct 8*a*. On the contrary, a through-passage opening 16*d* of the transport duct 6*d* at low rotary speed is freed up and thus opened on account of the resulting position of the piston 10*b* in the radially oriented duct 8*b*.

As indicated by FIGS. 1*a* and 2*a*, two opposite directions are possible for the flowing fluid. In one embodiment, however, it is provided that the fluid at first flows through the central transport duct 4 and, depending on the respective position of the piston 10*a*, 10*b*, then across a respective radial transport duct 8*a*, 8*b* through the through-passage opening 16*a*, 16*b*, 16*c*, 16*d* and through a respective transport duct 6*a*, 6*b*, 6*c*, 6*d*, at a distance from the central axis 100. In this case, a current of flow of the fluid or of a corresponding medium is assisted by the centrifugal force acting upon it.

A rotary speed-dependent characteristic for a flow or a flowing quantity of the fluid moving through the particular system furthermore depends on the geometry of the transport ducts 4, 6*a*, 6*b*, 6*c*, 6*d* or their through-passage opening 16*a*, 16*b*, 16*c*, 16*d*, while a normal vector of a cross sectional surface of the through-passage opening 16*a*, 16*b*, 16*c*, 16*d* is parallel to the axis 100, while the respective through-passage opening 16*a*, 16*b*, 16*c*, 16*d* is formed here as drop-shaped by definition and thus as a tapering circle at a first end and as an obtuse circle at the second opposite end. In the first embodiment of the system (FIG. 1*b*), a through-passage opening 16*a*, 16*b* of a decentral transport duct 6*a*, 6*b* has an axially oriented extension, the cross sectional surface of which increases from a minimal value at the pointed first end with increasing radial distance from the central axis 100 to the second obtuse end. Conversely, in the second embodiment of the system (FIG. 2*b*), it is proposed that the axial extension of the cross-sectional surface of a through-passage opening 16*c*, 16*d* of a respective decentral transport duct 6*c*, 6*d* decreases from a maximum value at the obtuse second end with increasing radial distance from the central axis 100 to the first pointed end.

Moreover, the characteristic of the mass of the piston 10*a*, 10*b* is dependent on a characteristic of the spring 12*a*, 12*b*, which describes the dependency of a force of the spring 12*a*, 12*b* acting on the piston 10*a*, 10*b*, and/or on the respective length or extension of the spring 12*a*, 12*b*. Furthermore, the characteristic for the volume flow rate of the fluid is dependent on the texture in the interior wall of the respective transport duct 4, 6*a*, 6*b*, 6*c*, 6*d* and thus the respective surface quality of the sliding surface of the respective transport duct 4, 6*a*, 6*b*, 6*c*, 6*d* and on the viscosity of the fluid. In both embodiments presented here, the pistons 10*a*, 10*b* are cylinder shaped, as an example. However, it is also possible for a particular piston 10*a*, 10*b* to be ball shaped, for example. Accordingly, the springs 12*a*, 12*b* are configured here, for example, as cylindrical compression springs. However, it is also conceivable for a spring 12*a*, 12*b* to be formed alternatively as a tension spring. Generally, each system has at least one radially oriented transport duct 8*a*, 8*b* to receive a respective regulating device. However, it is also possible to provide more than two such radial ducts 8*a*, 8*b* for the same number of regulating devices in a respective carrier body 2*a*, 2*b*.

In the first embodiment of the method with the first embodiment of the system, a volume flow rate or a quantity of the flowing fluid is accordingly increased by the increasing cross sectional surface of the through-passage opening 16*a*, 16*b* of the transport duct 6*a*, 6*b* with increasing rotary speed and/or a pressure of the fluid flowing through the through-passage opening 16*a*, 16*b* is reduced. In the second embodiment of the method with the second embodiment of the system, the volume flow rate or the quantity of the flowing fluid is throttled by the decreased through-passage opening 16*c*, 16*d* of the transport duct 6*c*, 6*d* with increasing rotary speed and/or a pressure of the fluid flowing through the through-passage opening 16*c*, 16*d* is increased.

Figure 3:
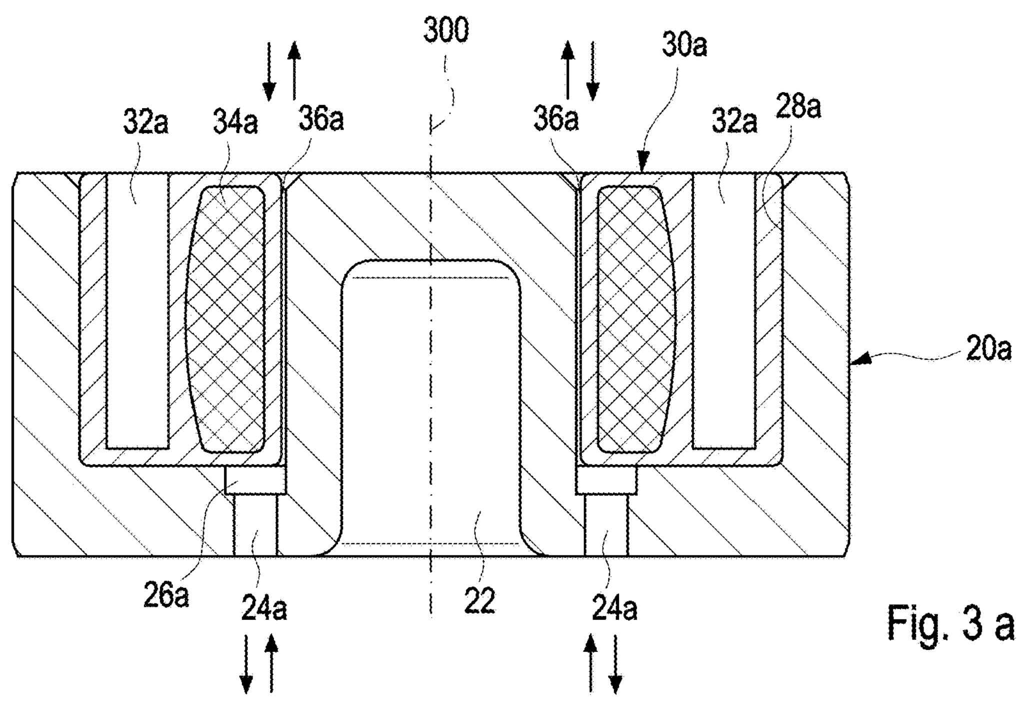
FIGS. 3*a* and 3*b* show in schematic representation a third embodiment of the system according to the disclosure to carry out a third embodiment of the method according to the disclosure.
Figure 3:
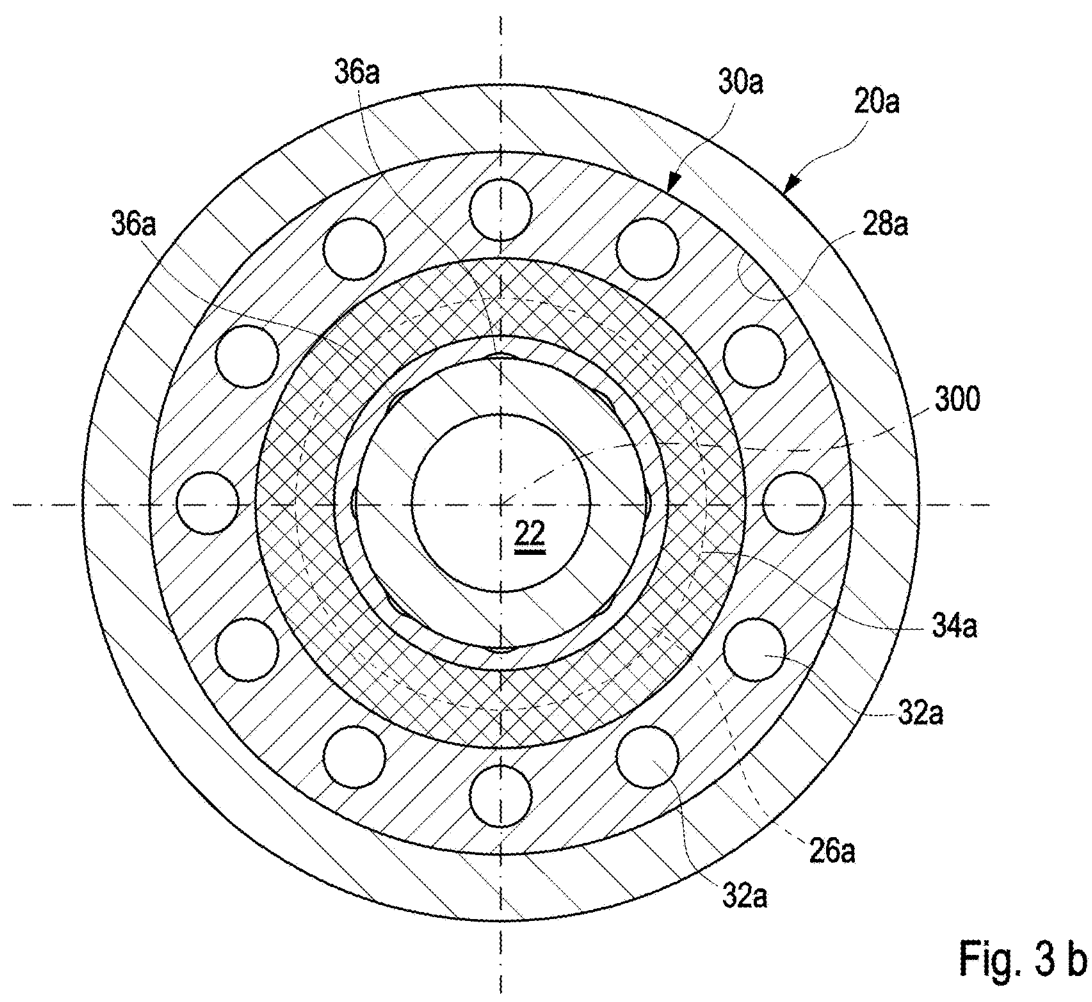
Figure 4:
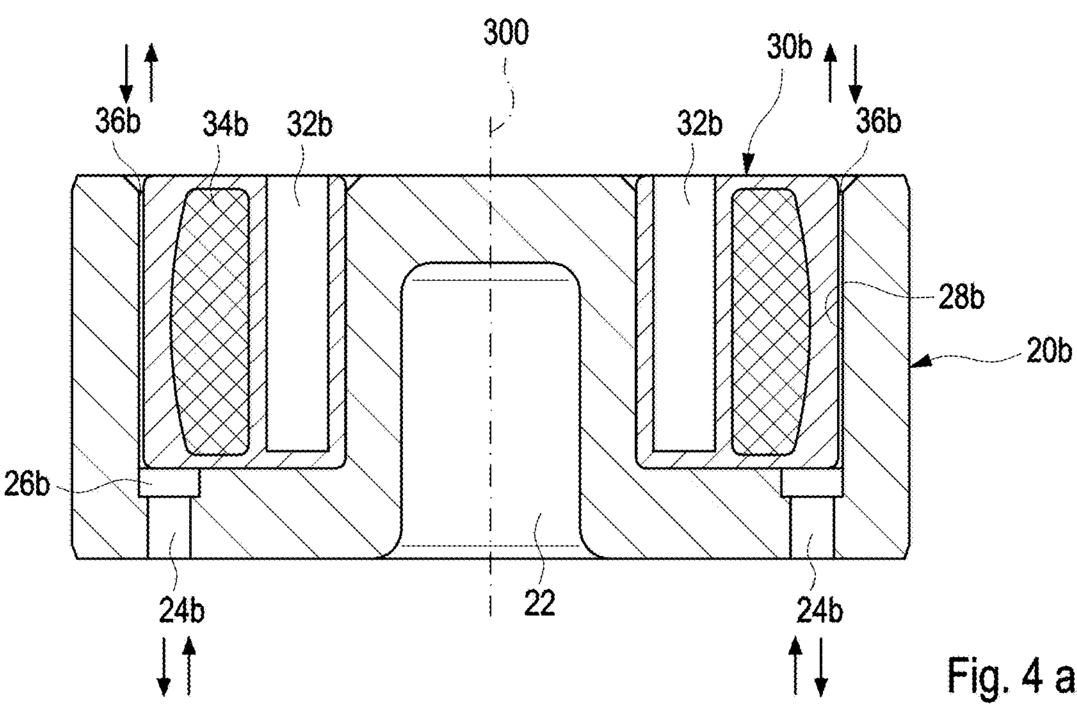
FIGS. 4*a* and 4*b* show in schematic representation a fourth embodiment of the system according to the disclosure to carry out a fourth embodiment of the method according to the disclosure.
Figure 4:
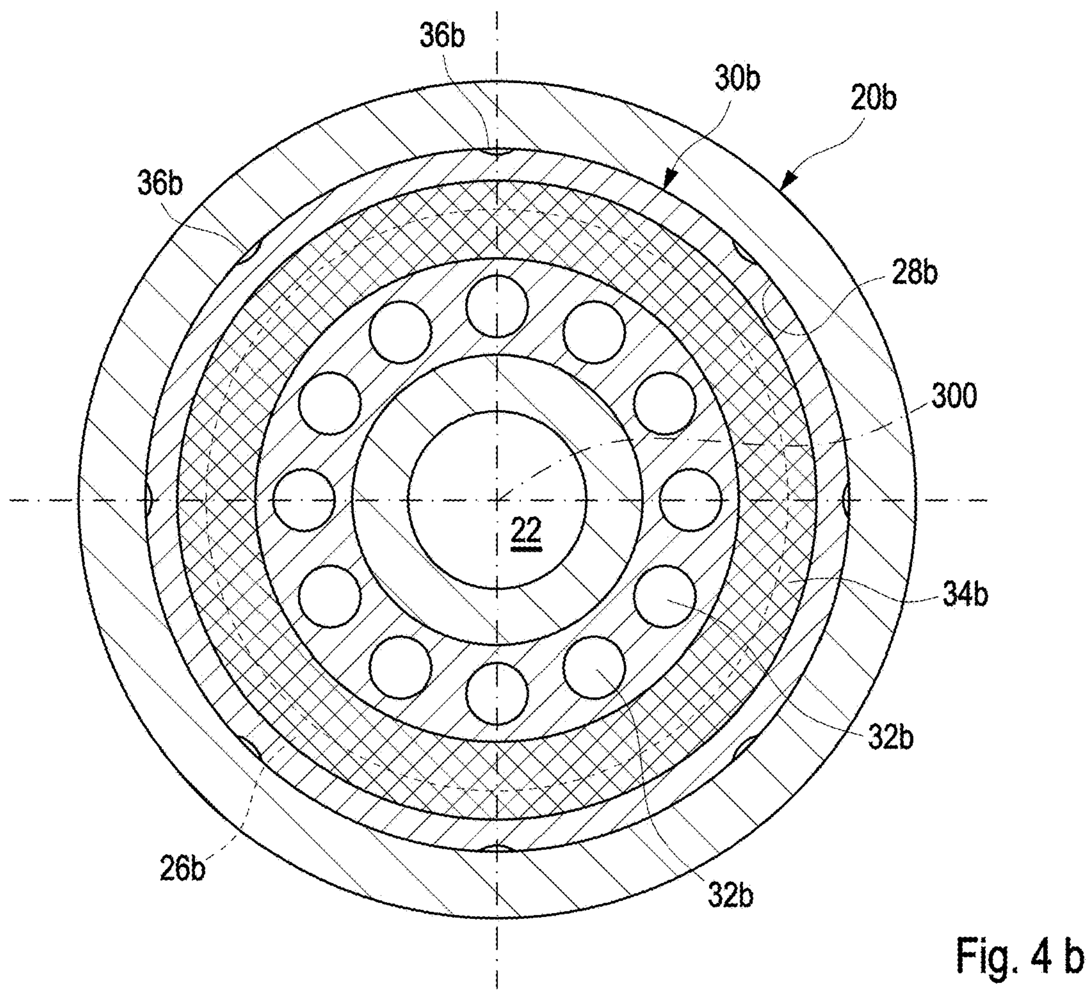
Figure 5:
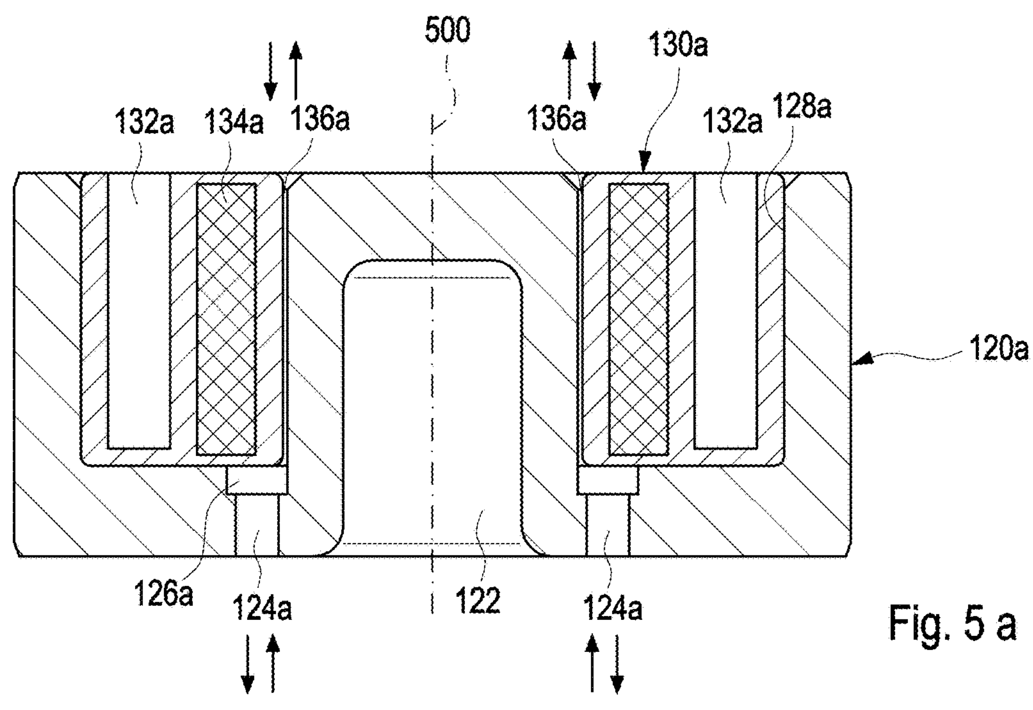
FIGS. 5*a* and 5*b* show in schematic representation a fifth embodiment of the system according to the disclosure to carry out a fifth embodiment of the method according to the disclosure.
Figure 5:
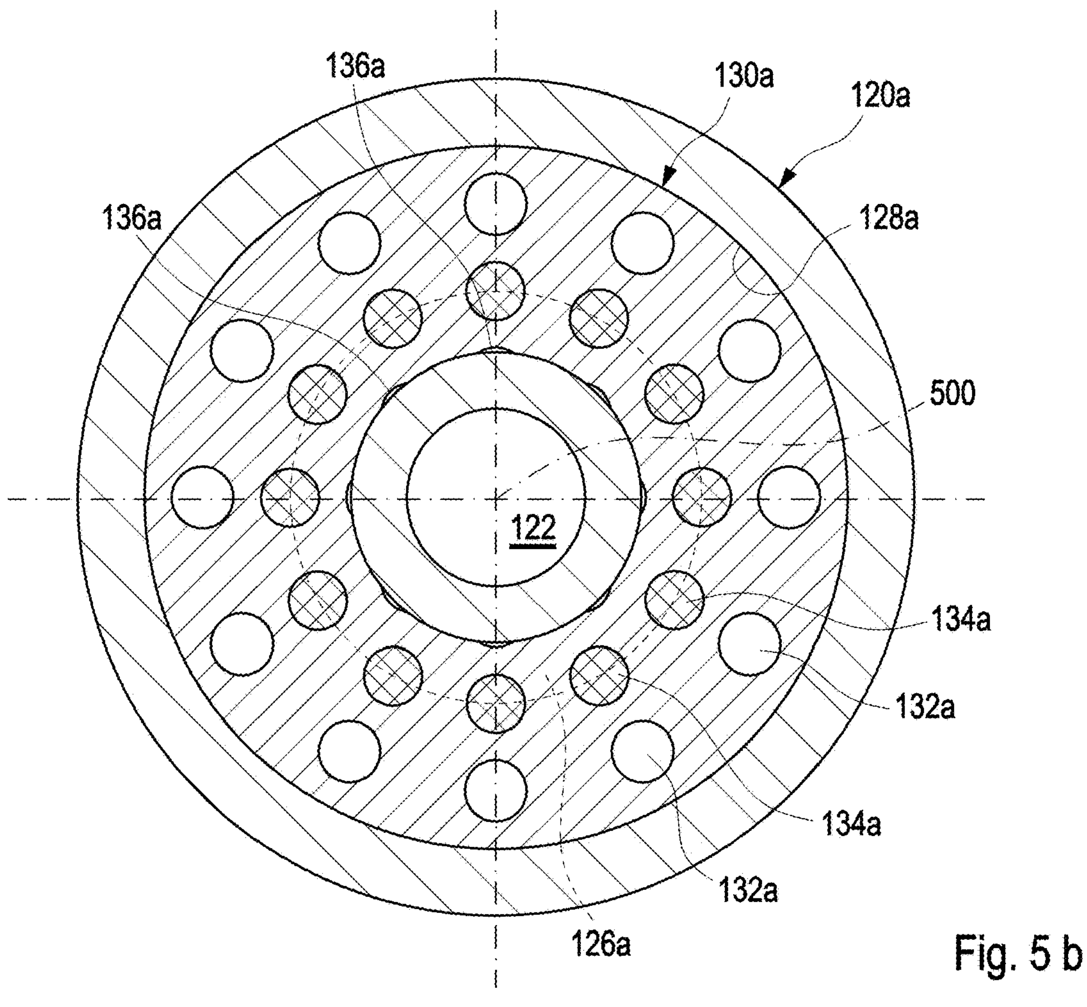
Figure 6:
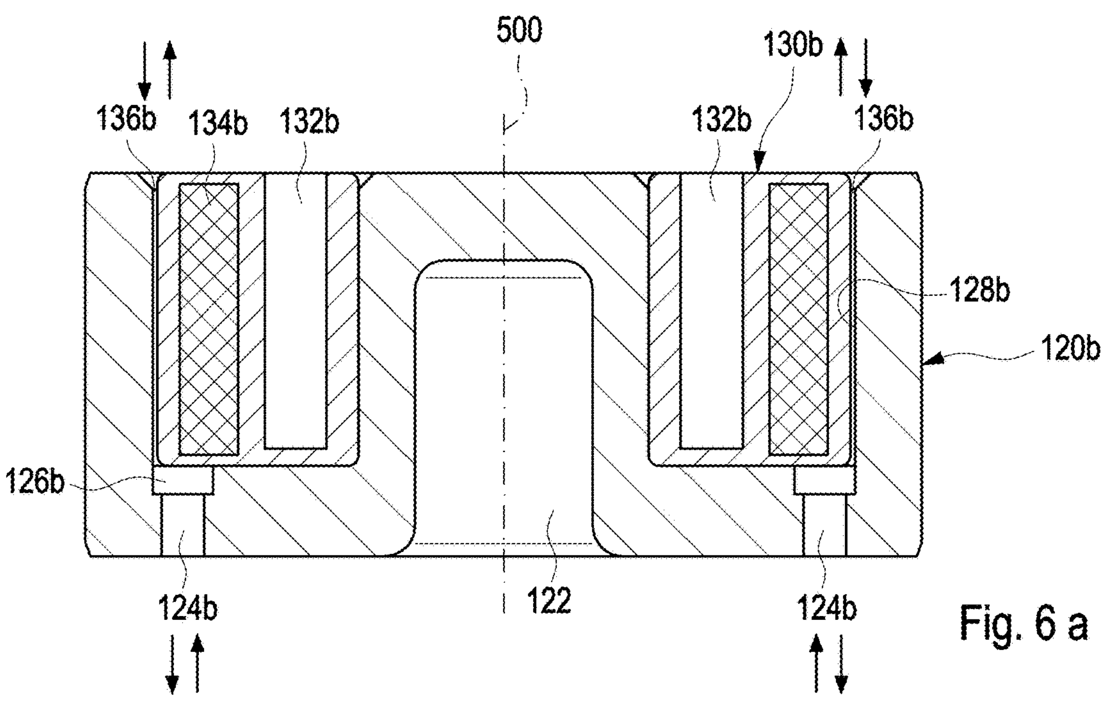
FIGS. 6*a* and 6*b* show in schematic representation a sixth embodiment of the system according to the disclosure to carry out a sixth embodiment of the method according to the disclosure.
Figure 6:
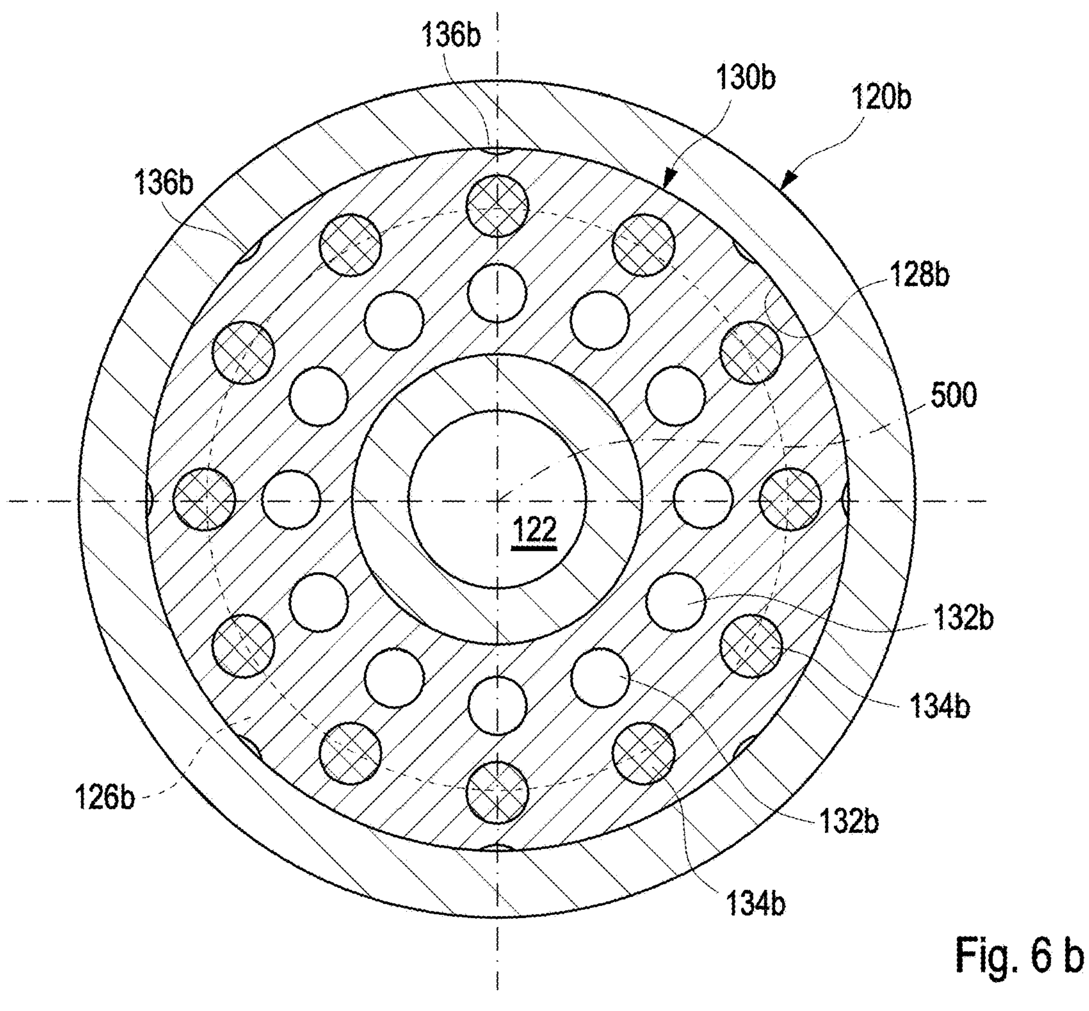

The third embodiment of the system according to the disclosure to carry out the third embodiment of the method according to the disclosure is shown schematically in FIG. 3*a* in a cross section through a central axis 300 and in FIG. 3*b* in a cross section perpendicular to the central axis 300. The fourth embodiment of the system according to the disclosure to carry out the fourth embodiment of the method according to the disclosure is shown schematically in FIG. 4*a* in a cross section through a central axis 300 and in FIG. 4*b* in a cross section perpendicular to the central axis 300. The fifth embodiment of the system according to the disclosure to carry out the fifth embodiment of the method according to the disclosure is shown schematically in FIG. 5*a* in a cross section through a central axis 500 and in FIG. 5*b* in a cross section perpendicular to the central axis 500. The sixth embodiment of the system according to the disclosure to carry out the sixth embodiment of the method according to the disclosure is shown schematically in FIG. 6*a* in a cross section through a central axis 500 and in FIG. 6*b* in a cross section perpendicular to the central axis 500.

The third, fourth, fifth and sixth embodiment of the system each comprise a carrier body 20*a*, 20*b*, 120*a*, 120*b*, which can turn about the respective central axis 300, 500. Moreover, each carrier body 20*a*, 20*b*, 120*a*, 120*b* comprises a central axial borehole 22 and multiple axially oriented decentral boreholes as transport ducts 24*a*, 24*b*, 124*a*, 124*b*, which are regularly arranged about the central axis 300, 500. Moreover, each carrier body 20*a*, 20*b*, 120*a*, 120*b* has a cylindrical envelope or annular recess 28*a*, 28*b*, 128*a*, 128*b* to receive an elastically deformable and rotationally symmetrical main body 30*a*, 30*b*, 130*a*, 130*b* as the regulating device, which is arranged therein. An inner section of the carrier body 20*a*, 20*b*, 120*a*, 120*b* is coaxially enclosed by the recess 28*a*, 28*b*, 128*a*, 128*b* and the main body 30*a*, 30*b*, 130*a*, 130*b* received in it. Moreover, an outer section of the carrier body 20*a*, 20*b*, 120*a*, 120*b* coaxially encloses the recess 28*a*, 28*b*, 128*a*, 128*b* and the main body 30*a*, 30*b*, 130*a*, 130*b* received therein.

It is proposed that in the third, fourth, fifth and sixth embodiment each main body 30*a*, 30*b*, 130*a*, 130*b* comprises multiple deformation regions 32*a*, 32*b*, 132*a*, 132*b*, which are distributed in angle-dependent or regular manner about the axis 300, 500, each deformation region 32*a*, 32*b*, 132*a*, 132*b* being formed here as a borehole and/or duct in the main body 30*a*, 30*b*, 130*a*, 130*b* and thus each enclosing a cylinder-shaped cavity. Each decentral borehole or a corresponding transport duct 24*a*, 24*b*, 124*a*, 124*b* in the carrier body 20*a*, 20*b*, 120*a*, 120*b* is also formed as an axial prolongation of the annular recess 28*a*, 28*b*, 128*a*, 128*b*.

In the third and fourth embodiment of the system, yet another rotationally symmetrical accessory body 34*a*, 34*b* is integrated in the main body 30*a*, 30*b*, this accessory body 34*a*, 34*b* having a different elasticity than the main body 30*a*, 30*b*, for example, the elasticity of the accessory body 34*a*, 34*b* is less than the elasticity of the main body 30*a*, 30*b*, and/or the density of the accessory body 34*a*, 34*b* being, for example, greater than the density of the main body 30*a*, 30*b*. Furthermore, in the third embodiment of the system the accessory body 34*a* has less radial distance from the central axis 300 than each deformation region 32*a*. On the other hand, in the fourth embodiment of the system the accessory body 34*b* has a greater radial distance from the central axis 300 than each deformation region 32*b*.

In the fifth and sixth embodiment of the system it is proposed that multiple axially oriented mass bodies 134*a*, 134*b* are integrated in the main body 130*a*, 130*b* or arranged therein and distributed in regular angular manner about the axis 500. Each mass body 134*a*, 134*b* as one embodiment of an accessory body in the main body 130*a*, 130*b* usually has less elasticity than the main body 130*a*, 130*b* and/or a greater density than the main body 130*a*, 130*b*. Furthermore, in the fifth embodiment of the system each mass body 134*a* has less radial distance from the central axis 500 than each deformation region 132*a*. On the other hand, in the sixth embodiment of the system each mass body 134*b* has a greater radial distance from the central axis 500 than each deformation region 132*b*.

In the third, fourth, fifth and sixth embodiment multiple axially oriented through-passage openings 36*a*, 36*b*, 136*a*, 136*b* are provided, each time being located between the main body 30*a*, 30*b*, 130*a*, 130*b* and the carrier body 20*a*, 20*b*, 120*a*, 120*b* and being distributed in regular angle-dependent manner about the axis 300, 500, each through-passage opening 36*a*, 36*b*, 136*a*, 136*b* having a cross sectional surface whose normal vector is oriented or directed parallel to the axis 300, 500, and each through-passage opening 36*a*, 36*b*, 136*a*, 136*b* being associated with a transport duct 24*a*, 24*b*, 124*a*, 124*b* and formed as an axial prolongation of the respective transport duct 24*a*, 24*b*, 124*a*, 124*b*. Between each through-passage opening 36*a*, 36*b*, 136*a*, 136*b* and each transport duct 24*a*, 24*b*, 124*a*, 124*b* there is furthermore arranged in the carrier body 20*a*, 20*b*, 120*a*, 120*b* a cylinder envelope-shaped or annular transport duct 26*a*, 26*b*, 126*a*, 126*b* and thus an annular duct, which coaxially encloses the axis 300, 500.

In this regard, it is proposed in the third and fifth embodiments of the system that each through-passage opening 36*a*, 136*a* is enclosed by the main body 30*a*, 130*a*, being arranged between a cylinder-shaped inner wall of the main body 30*a*, 130*a* and a cylinder-shaped outer wall of the inner section of the carrier body 20*a*, 120*a* and having less distance from the axis 300, 500 than the main body 30*a*, 130*a*. On the other hand, in the fourth and sixth embodiments of the system, it is proposed that the through-passage openings 36*b*, 136*b* enclose the main body 30*b*, 130*b*, each through-passage opening 36*b*, 136*b* being arranged between a cylinder-shaped outer wall of the main body 30*b*, 130*b* and a cylinder-shaped inner wall of the outer section of the carrier body 20*b*, 120*b* and having a greater distance from the axis 300, 500 than the main body 30*b*, 130*b*.

During operation of the third, fourth, fifth, and sixth embodiment of the system and thus in the, fourth, fifth, and sixth embodiment of the method according to the disclosure, the main body 30*a*, 30*b*, 130*a*, 130*b* is elastically deformed in the radial direction by virtue of a rotation about the central axis 300, 500 and is forced outward and away from the axis 300, 500 by centrifugal force. In the third and fifth embodiment of the system and the method, each cross sectional surface of a through-passage opening 36*a*, 136*a* is increased outward in the radial direction, so that the pressure of the fluid is reduced by the increased through-passage opening 36*a*, 136*a* and/or the volume flow rate of the fluid is increased through the increased through-passage opening 36*a*, 136*a*. On the other hand, in the fourth and sixth embodiment of the system and the method, each cross sectional surface of a through-passage opening 36*b*, 136*b* is decreased or reduced outward in the radial direction, so that the pressure of the fluid is increased by the decreased through-passage opening 36*b*, 136*b* and/or the volume flow rate of the fluid is throttled by the decreased through-passage opening 36*b*, 136*b*.

It is possible for the fluid to stream or flow through the respective system in a first or an opposite second direction, as indicated by arrows each time in FIGS. 3 to 6.

Figure 7:
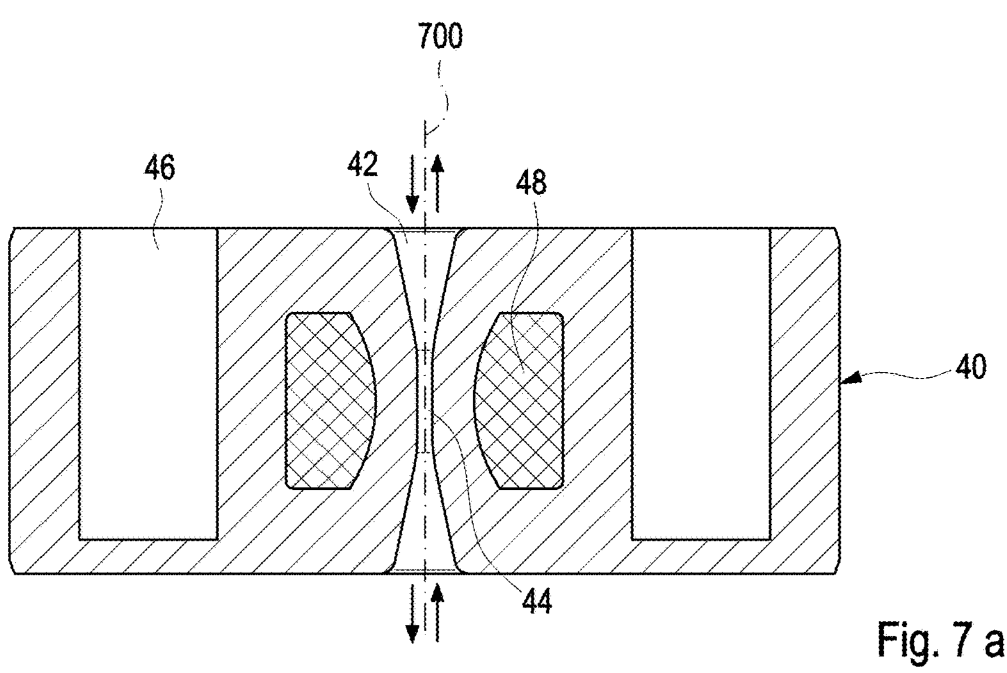
FIGS. 7*a* and 7*b* show in schematic representation a seventh embodiment of the system according to the disclosure to carry out a seventh embodiment of the method according to the disclosure.
Figure 7:
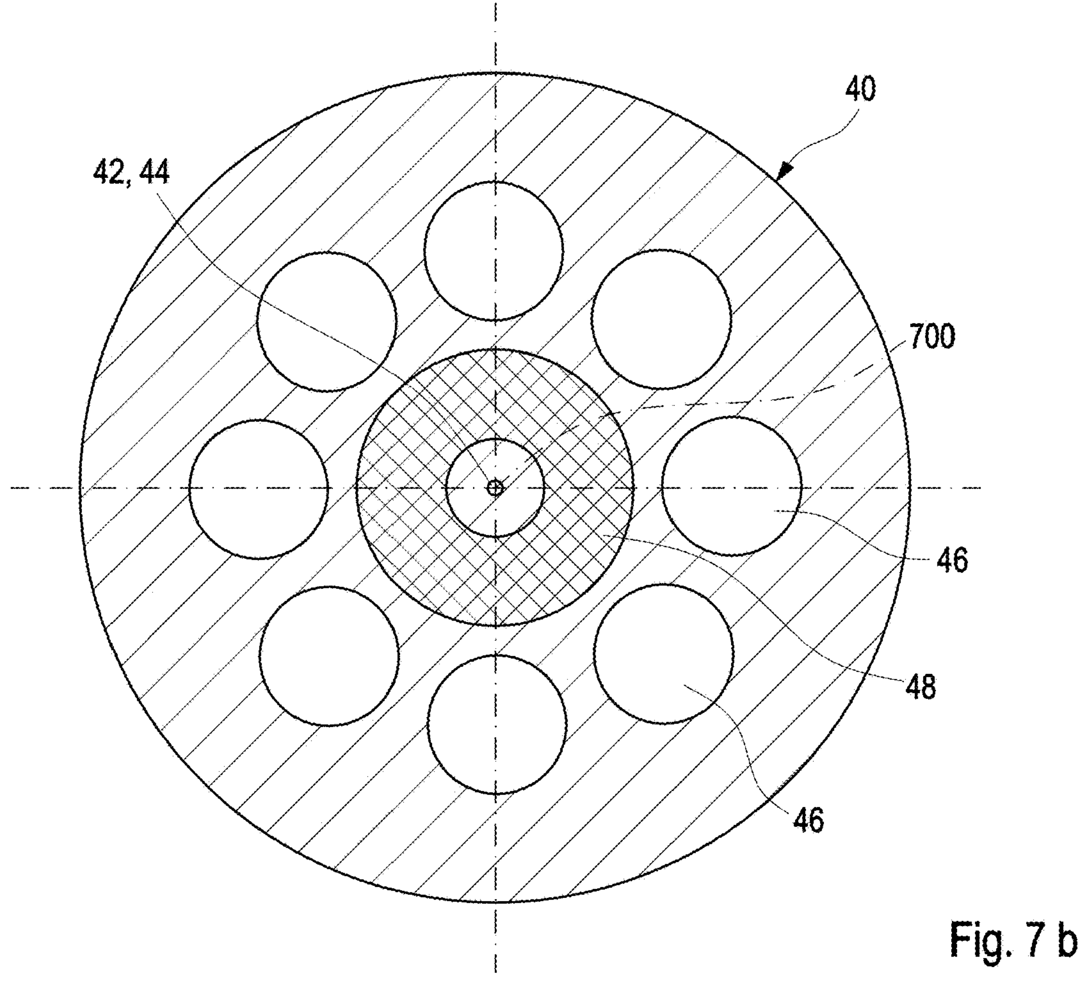
Figure 8:
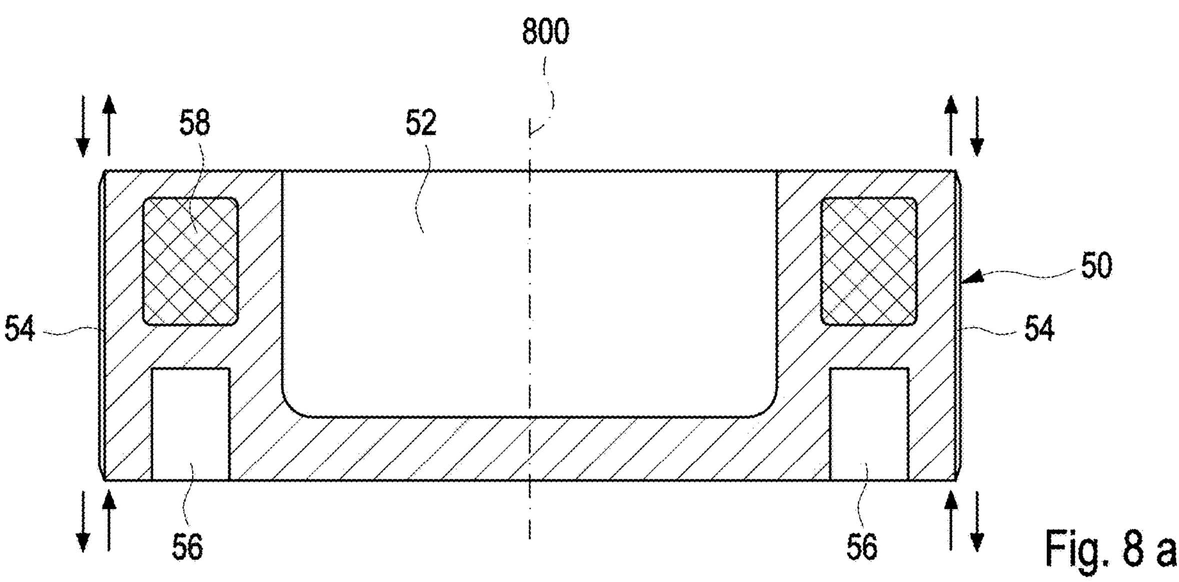
FIGS. 8*a* and 8*b* show in schematic representation an eighth embodiment of the system according to the disclosure to carry out an eighth embodiment of the method according to the disclosure.
Figure 8:
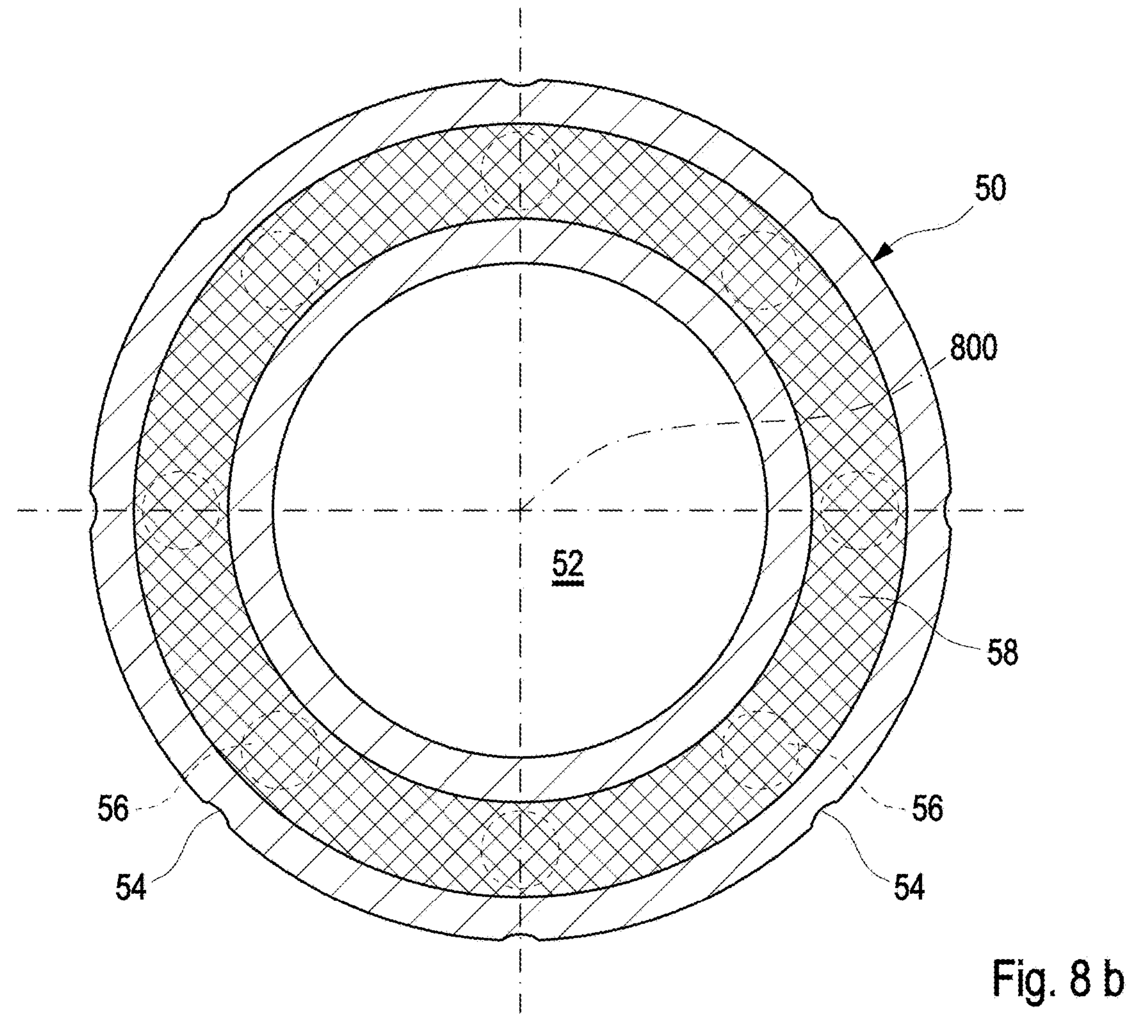
Figure 9:
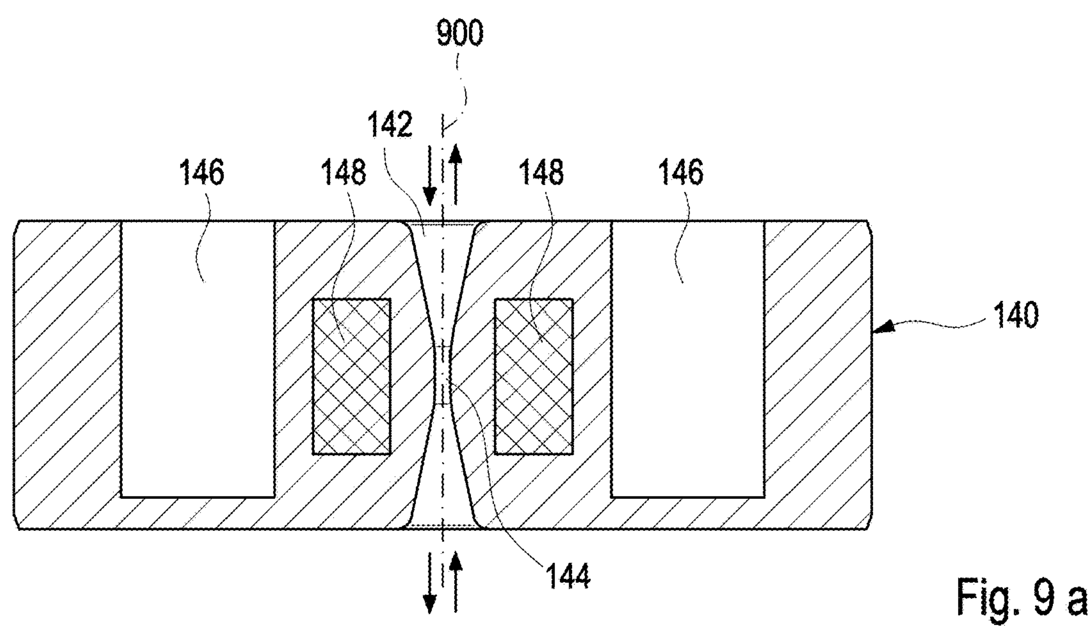
FIGS. 9*a* and 9*b* show in schematic representation a ninth embodiment of the system according to the disclosure to carry out a ninth embodiment of the method according to the disclosure.
Figure 9:
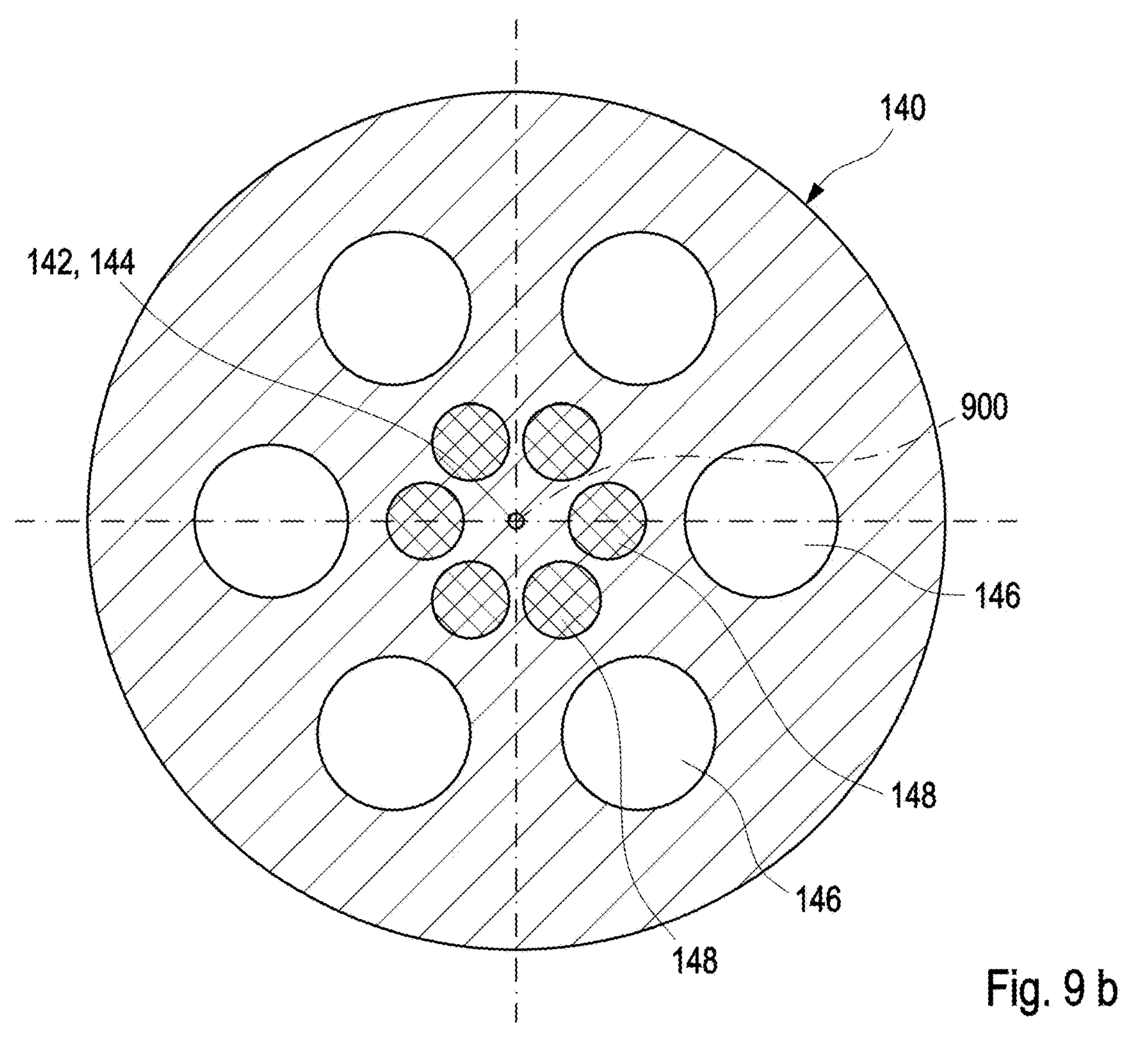
Figure 10:
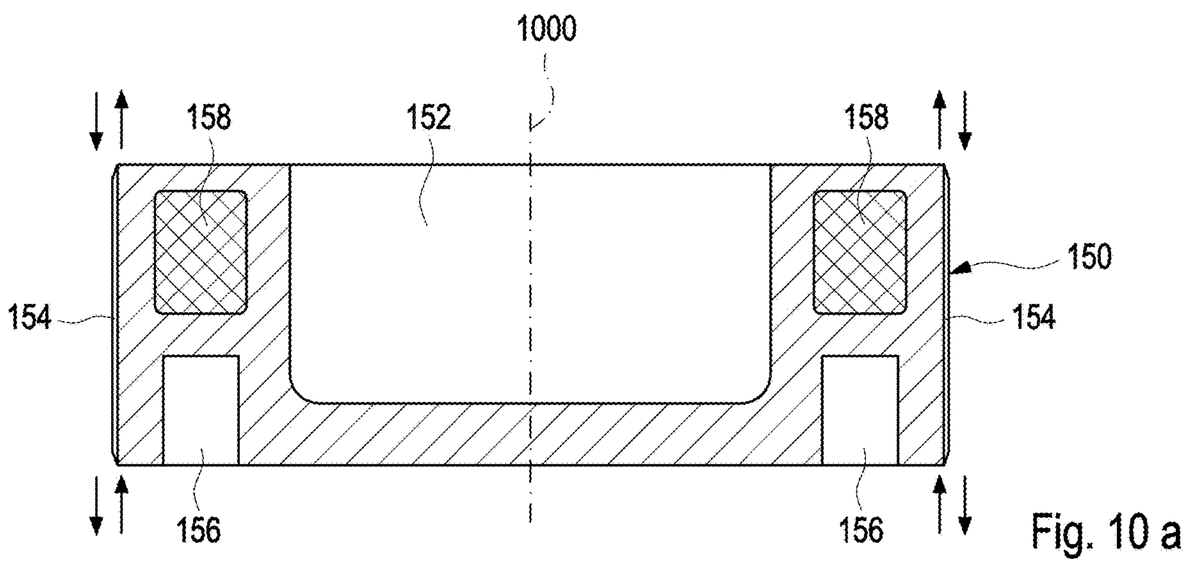
FIGS. 10*a* and 10*b* show in schematic representation a tenth embodiment of the system according to the disclosure to carry out a tenth embodiment of the method according to the disclosure.
Figure 10:
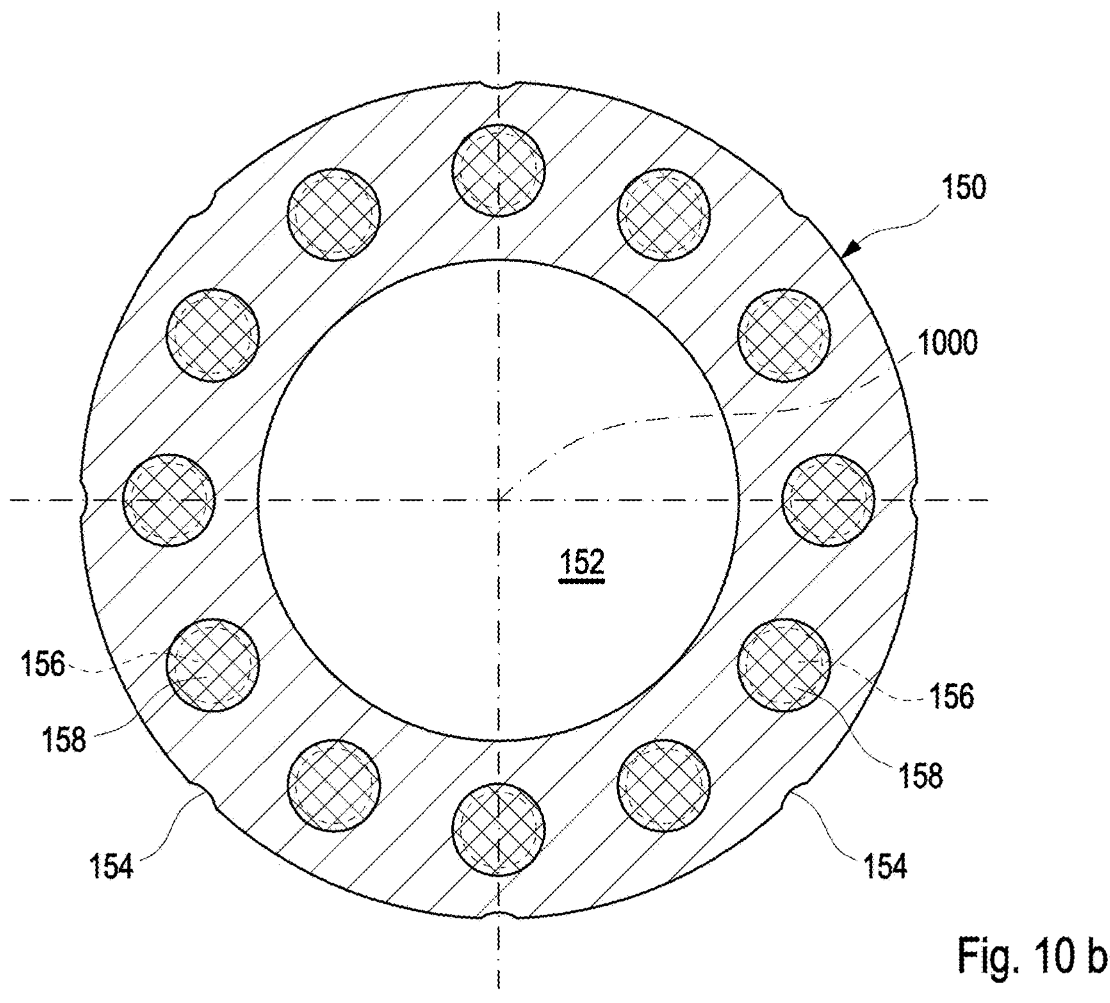

The seventh embodiment of the system according to the disclosure to carry out the seventh embodiment of the method according to the disclosure is shown schematically in FIG. 7*a* in a cross section through a central axis 700 and in FIG. 7*b* in a cross section perpendicular to the central axis 700. The eighth embodiment of the system according to the disclosure to carry out the eighth embodiment of the method according to the disclosure is shown schematically in FIG. 8*a* in a cross section through a central axis 800 and in FIG. 8*b* in a cross section perpendicular to the central axis 800. The ninth embodiment of the system according to the disclosure to carry out the ninth embodiment of the method according to the disclosure is shown schematically in FIG. 9*a* in a cross section through a central axis 900 and in FIG. 9*b* in a cross section perpendicular to the central axis 900. The tenth embodiment of the system according to the disclosure to carry out the tenth embodiment of the method according to the disclosure is shown schematically in FIG. 10*a* in a cross section through a central axis 1000 and in FIG. 10*b* in a cross section perpendicular to the central axis 1000.

The seventh, eighth, ninth and tenth embodiment of the system comprises an elastically deformable and rotationally symmetrical main body 40, 50, 140, 150 as the regulating device. Moreover, the main body 40, 50, 140, 150 comprises multiple hollow deformation regions 46, 56, 146, 156, formed here as boreholes and/or as ducts, which are distributed in regular manner about the central axis 700, 800, 900, 1000.

In addition, the seventh and eighth embodiment comprises an annular accessory body 48, 58, coaxially enclosing the central axis 700, 800, this accessory body 48, 58 having a different elasticity than the main body 40, 50, for example, the elasticity of the accessory body 48, 58 is less than the elasticity of the main body 40, 50, and/or the density of the accessory body 48, 58 is, for example, greater than the density of the main body 40, 50. In the seventh embodiment, the accessory body 48 has less radial distance from the central axis 700, 800 than each deformation region 46. By contrast, in the eighth embodiment, the accessory body 58 and each deformation region 56 have the same radial distance from the central axis 700, 800.

In the ninth and tenth embodiment of the system, multiple axially oriented mass bodies 148, 158 are integrated in the main body 140, 150 or arranged therein and being distributed in regular angle-dependent manner about the axis 900, 1000. Each mass body 148, 158 as a formation of an accessory body in the main body 140, 150 usually has less elasticity than the main body 140, 150 and/or a greater density than the main body 140, 150. In the ninth embodiment, each mass body 148 has less radial distance from the central axis 900, 1000 than each deformation region 146. By contrast, in the tenth embodiment, the mass body 158 and each deformation region 156 have the same radial distance from the central axis 900, 1000.

In the seventh and ninth embodiment of the system, a central axial regulating duct is led through the main body 40, 140 as a further transport duct 42, 142 for the fluid, being elastically deformable like the main body 40, 140 and having here a through-passage opening 44, 144 with a cross sectional surface whose normal vector is oriented parallel to the axis 700, 900. The size of the cross sectional surface during operation of the seventh or ninth embodiment of the system when carrying out the seventh or ninth embodiment of the method increases with increasing rotary speed by virtue of a rotary speed-dependent radial extension of the main body 40, 140, whereupon the volume flow rate of the fluid through the through-passage opening 44, 144 is increased and/or the pressure of the fluid flowing through is decreased.

In the eighth and tenth embodiment of the system, the main body 50, 150 is arranged in a not otherwise represented rigid carrier body, wherein a cylinder-shaped outer wall of the main body 50, 150 is enclosed by a cylinder-shaped inner wall of the carrier body. Multiple through-passage openings 54, 154 are arranged between the main body 50, 150 and the carrier body, being distributed evenly in angular-dependent manner about the central axis 800, 1000, each through-passage opening 54, 154 having a cross sectional surface whose normal vector is oriented parallel to the central axis 800, 1000. It is possible for each through-passage opening 54, 154 to decrease, with increasing rotary speed during operation of the eighth or tenth embodiment of the system when carrying out the eighth or tenth embodiment of the method, the cross sectional surface of each through-passage opening 54, 154 on account of a rotary speed-dependent radial extension of the main body 50, 150 with respect to the carrier body surrounding it, whereupon the volume flow rate of the fluid through the respective through-passage opening 54, 154 is decreased or reduced and/or the pressure of the fluid flowing through it is increased.

It is also possible for the fluid to stream or flow through the respective system in a first or an opposite second direction, as indicated by arrows each time in FIGS. 7 to 10.

In the embodiments shown with the aid of FIGS. 3 to 10, the increasing or throttling of the pressure and/or the volume flow rate is dependent on a material property of the respective main body 30*a*, 30*b*, 40, 50, 130*a*, 130*b*, 140, 150 as a component and a distribution of the deformation regions 32*a*, 32*b*, 46, 56, 132*a*, 132*a*, 146, 156 arranged therein and/or of the accessory body 34*a*, 34*b*, 48, 58 integrated therein as a component or of the mass body 134*a*, 134*b*, 148, 158 integrated therein as components and their material properties. A material or material-specific property of the respectively mentioned component is, e.g., the elasticity, the Shore hardness, the biasing force, the deformation capability, the mass and/or the density. Moreover, the geometrical and thus the spatial distribution of the respective component, for example, its mass, elasticity and/or density, with respect to the central axis 300, 500, 700, 800, 900, 1000, should be taken into account. Moreover, each rotary speed-dependent cross-sectional surface of a respective through-passage opening 36*a*, 36*b*, 44, 54, 136*a*, 136*b*, 144, 154 within the main body 40, 140 or between the main body 30*a*, 30*b*, 50, 130*a*, 130*b*, 150 and the respective carrier body 20*a*, 20*b*, 120*a*, 120*b* should be taken into account. It is furthermore possible for each main body 30*a*, 30*b*, 40, 50, 130*a*, 130*b*, 140, 150, having a constant cylinder-shaped outer wall and/or inner wall, alternatively has a radially changing, e.g., a nonconstant or truncated conical or conical outer wall and/or inner wall. The number of through-passage openings 36*a*, 36*b*, 44, 54, 136*a*, 136*b*, 144, 154 is variable, and these can be arranged symmetrically or asymmetrically with respect to the axis 300, 500, 700, 800, 900, 1000, as described herein.

A regulating and/or adjusting, as well as an intentional changing of the cross sectional surface of each through-passage opening 36*a*, 36*b*, 44, 54, 136*a*, 136*b*, 144, 154 whose normal vector is oriented parallel to the axis 300, 500, 700, 800, 900, 1000 will be either increased or decreased in rotary speed-dependent manner, depending on the embodiment of the system.

German patent application no. 10 2022 106609.6, filed Mar. 22, 2022, and U.S. patent application Ser. No. 18/187, 556, filed Mar. 21, 2023, to which this application claims priority, are hereby incorporated herein by reference, in their entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for regulating a flow of a fluid, the system comprising:

a carrier body having at least one recess and being configured to rotate about a central axis; and a regulating device provided in the at least one recess of the carrier body, the regulating device including a main body made of elastically deformable material which is centered about the central axis, wherein the regulating device is adapted to establish at least one through-passage opening for the fluid, wherein a normal vector of a cross sectional area of the at least one through-passage opening is oriented parallel to the central axis, and wherein a size of the cross sectional area is adjusted in dependence on a rotary speed of the regulating device turning about the central axis.

2. The system according to claim 1, wherein the carrier body includes at least one respective transport duct associated with each of the at least one through-passage opening, and wherein each respective transport duct is oriented parallel to the central axis.

3. The system according to claim 1, wherein at least one deformation region is integrated in the main body.

4. The system according to claim 1, wherein at least one accessory body is integrated in the main body, the at least one accessory body having a different elasticity and/or density than a remainder of the main body.

5. The system according to claim 1, wherein at least one mass body is integrated in the main body.

6. The system according to claim 1, wherein the cross sectional area of the at least one through-passage opening is established by deformation of the main body as the main body rotates during operation.

7. The system according to claim 1, wherein at least one transport duct and an interface region between the main body and the carrier body are connected to each other, and wherein the at least one through-passage opening is arranged in the interface region between the carrier body and the main body.

8. The system according to claim 1, wherein at least one axially oriented and elastically deformable transport duct has a through-passage opening and is led through the main body.

9. A method for regulating a flow of a fluid, the method comprising:

providing a system including a carrier body having at least one recess which is configured to rotate about a central axis, and including a regulating device provided in the at least one recess of the carrier body, the regulating device including a main body made of elastically deformable material which is centered about the central axis, and wherein the regulating device is adapted to establish at least one through-passage opening for the fluid, wherein a normal vector of a cross sectional area of the at least one through-passage opening is oriented parallel to the central axis about which the carrier body is configured to rotate; and adjusting a size of the cross sectional area of the at least one through-passage opening in dependence on a rotary speed of the regulating device turning about the central axis.

10. The method according to claim 9, wherein adjusting the size of the cross sectional area of the at least one through-passage opening includes deforming the main body as the main body rotates during operation.

* * * * *